(12) United States Patent
Bohanek

(10) Patent No.: US 7,974,861 B1
(45) Date of Patent: Jul. 5, 2011

(54) DIGITAL ASSET INSURANCE

(75) Inventor: Robert Michael Bohanek, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 12/253,523

(22) Filed: Oct. 17, 2008

Related U.S. Application Data

(62) Division of application No. 12/141,421, filed on Jun. 18, 2008.

(51) Int. Cl.
 *G06Q 10/00* (2006.01)
(52) U.S. Cl. ............................................ 705/4; 707/634
(58) Field of Classification Search ........................ 705/4
 See application file for complete search history.

(56) References Cited

U.S. PATENT DOCUMENTS

| 6,922,720 | B2 | 7/2005 | Cianciarulo et al. | |
|---|---|---|---|---|
| 7,290,704 | B1 * | 11/2007 | Ball et al. | 235/380 |
| 7,386,463 | B2 * | 6/2008 | McCabe | 705/4 |
| 2002/0138442 | A1 | 9/2002 | Hori et al. | |
| 2003/0110126 | A1 * | 6/2003 | Dunkeld et al. | 705/39 |
| 2005/0137911 | A1 | 6/2005 | Conn et al. | |
| 2007/0112605 | A1 | 5/2007 | Dimston et al. | |
| 2008/0021979 | A1 | 1/2008 | Cianciarulo et al. | |
| 2009/0187433 | A1 * | 7/2009 | Nudd | 705/4 |
| 2009/0300025 | A1 * | 12/2009 | Rothschild | 707/10 |

OTHER PUBLICATIONS

Turney, J. Travis et al., "Cyber Security Insurance—Managing Risk in the Digital Age", Diamond Security Solutions, ISM 4320, Dec. 8, 2005.

* cited by examiner

*Primary Examiner* — Vivek D Koppikar
(74) *Attorney, Agent, or Firm* — Brooks, Cameron & Huebsch, PLLC

(57) ABSTRACT

Digital assets may be insured against loss. The digital assets may comprise commercial products and/or user-generated data. An insurance product may provide either for monetary reimbursement or replacement (e.g., repurchase) of the digital assets and/or for backup services to backup insured digital assets so that the insured digital assets may be retrieved if the original user copies are lost.

12 Claims, 6 Drawing Sheets

DIGITAL ASSET INSURANCE

CROSS-REFERENCE TO RELATED APPLICATIONS

The present application is a divisional patent application of U.S. patent application Ser. No. 12/141,421 filed Jun. 18, 2008, the entirety of which is hereby incorporated by reference herein. Further, this application is related by subject matter to that disclosed in the following commonly assigned applications, the entirety of which is hereby incorporated by reference herein: U.S. patent application Ser. No. 12/253,505, filed concurrently herewith and entitled "DIGITAL ASSET INSURANCE", and U.S. patent application Ser. No. 12/253,517, filed concurrently herewith and entitled "DIGITAL ASSET INSURANCE".

BACKGROUND

Insurance is a form of risk management primarily used to hedge against the risk of a contingent loss, and may be defined as the equitable transfer of the risk of a loss, from one entity to another, in exchange for a premium. An insurer is a company that sells insurance. An insurance rate is a factor used to determine the amount, called the premium, to be charged for a certain amount of insurance coverage.

A digital asset is any form of content and/or media that have been formatted into a binary source which include the right to use it. Digital assets may be categorized in groups such as textual content, images, and multimedia. A user may spend hundreds or thousands of dollars on the purchase of digital assets. No insurance product is available that directly provides coverage for a user's digital assets. For example, if a computer memory on which the user stored their purchased digital assets were to be lost or corrupted, the user may have to contact the digital asset source(s) for replacement of the digital assets.

SUMMARY

Digital assets may be insured against loss. The digital assets may comprise commercial products and/or user-generated data. An insurance product may provide either for monetary reimbursement or replacement (e.g., repurchase) of the digital assets and/or for backup services to backup insured digital assets so that the insured digital assets may be retrieved from storage and provided to the user if the original user copies are lost.

In an implementation, a user may forward a receipt, proof of purchase, and/or other documentation pertaining to a digital asset purchase and/or digital asset acquisition to an institution system. The institution system may generate a premium quote to insure the digital asset and send the premium quote to the user. The user may accept the premium quote, and the institution system may insure the digital asset. Alternatively or additionally, institution system may generate an offer to backup the digital asset and send the offer to the user. The user may accept the offer to backup the digital asset and the institution system may backup the digital asset. The institution system may store a backup copy of the digital asset in storage internal and/or external to the institution system.

In an implementation, a user computing device may have an application resident thereon that monitors the user's digital asset purchases and/or acquisitions. When the application detects that a digital asset has been purchased or otherwise acquired, the application may advise the institution system. The institution system may offer to insure or backup the digital asset.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
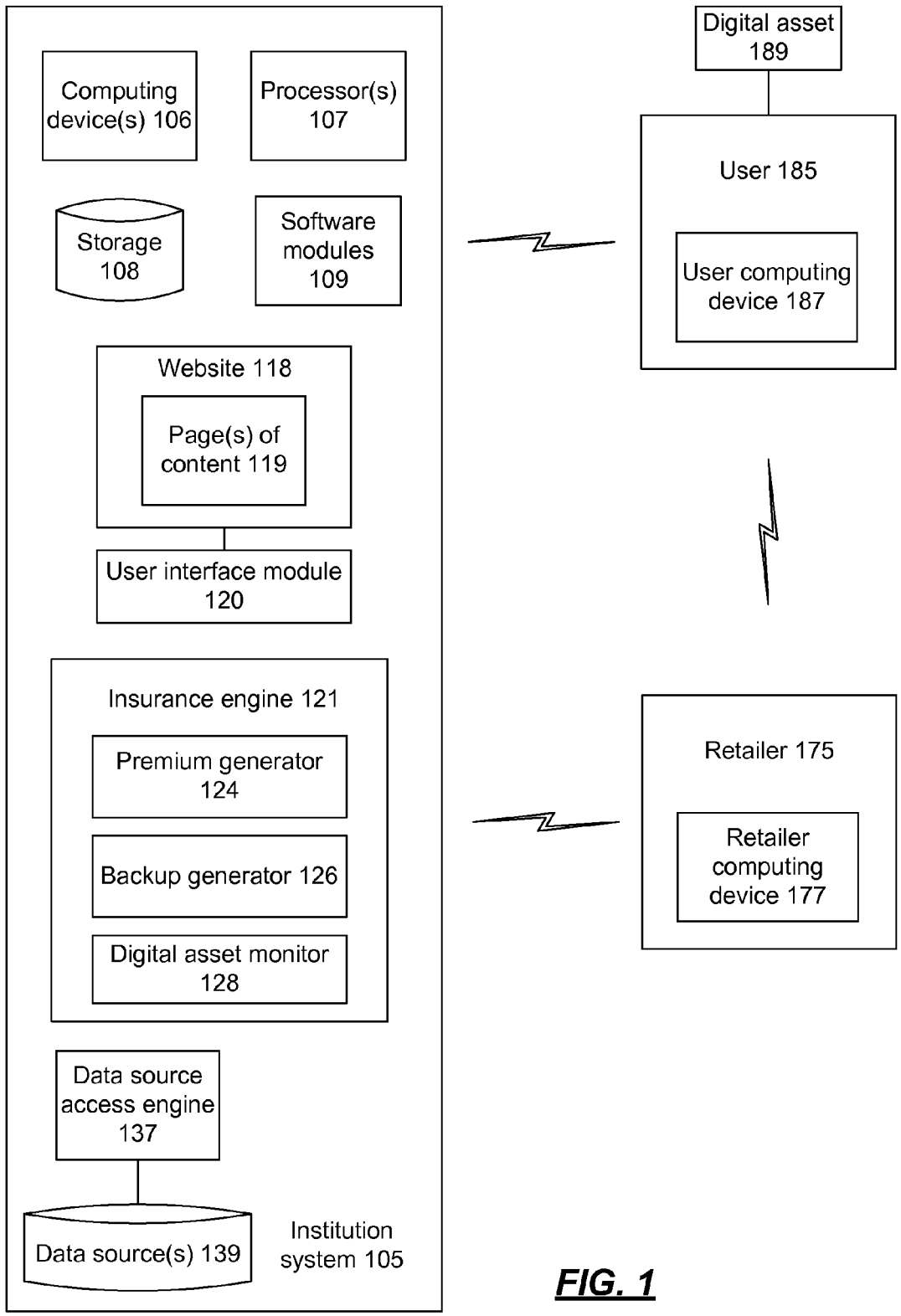
FIG. 1 is a block diagram of an implementation of a system that may be used to provide digital asset insurance.

FIG. 1 is a block diagram of an implementation of a system that may be used to provide digital asset insurance. An institution system 105 may be associated with an institution which may be any type of entity capable of providing insurance and/or data or file backup services. For example, the institution may be any type of insurance company, financial services company, etc.

A user 185 and an associated user computing device 187 are shown, along with a retailer 175 and an associated retailer computing device 177. The user 185 may obtain a digital asset 189 from the retailer 175 and insure the digital asset 189 with the institution system 105. A digital asset may include, for example, any type of media (music, videos, movies), personal files, personalized or customized files or data, software applications (e.g., commercial, freeware, shareware, etc.), software license keys, etc. Insuring the digital asset 189 may provide for monetary reimbursement, replacement, or recovery of a backup copy from storage of the digital asset 189 in the event of a loss, as described further herein.

The institution system 105 may include a user interface module 120, an insurance engine 121, and a data source access engine 137. The user interface module 120 may generate and format one or more pages of content 119 as a unified graphical presentation that may be provided to the user computing device 187 as an output from the insurance engine 121. In an implementation, the page(s) of content 119 may be provided to the user computing device 187 via a secure website 118 associated with the institution system 105. An example computing device is described with respect to FIG. 6.

The user 185 may be an individual who owns an insurance product (also may be referred to herein as a policy) or other account that may be provided by or held by the institution associated with the institution system 105. The user 185 may communicate with the institution system 105 by way of a communications network such as an intranet, the Internet, a local area network (LAN), a wide area network (WAN), a public switched telephone network (PSTN), a cellular network, a voice over Internet protocol (VoIP) network, and the like. The user 185 may also communicate with the institution system 105 by phone, email, instant messaging, facsimile, postal mail, and the like.

The retailer 175 may be any entity that may sell or distribute digital assets, e.g., to the user 185. The sale or distribution may take place electronically (e.g., downloading via the Internet or other network) or physically (e.g., via disk obtained by the user 185). The user 185 may be in communication with the retailer 175 via a communications network. Additionally, the institution system 105 and the retailer 175 may be in communication via a communications network.

In an implementation, the user 185 may provide a receipt, proof of purchase, or other documentation about a digital asset 189 that they would like to insure to the institution system 105. The user 185 may use an image generator, comprising a scanner for example, to generate a digital image of the receipt, proof of purchase, or other documentation. It is contemplated that any device that is capable of generating a digital image may be used to make a digital image of the receipt, proof of purchase, or other documentation. Additional devices that may be used in the generation of a digital image include a digital camera, a photocopier, a fax machine, and the like, for example.

The user 185 may transmit the digital image to the institution system 105 via the user computing device 187. The institution system 105 may use the digital image to generate a premium quote for insuring the digital asset 189. Alternatively, the user 185 may provide the receipt, proof of purchase, or other documentation about the digital asset 189 to the institution system 105 by any other electronic or physical techniques.

The insurance engine 121 may receive the receipt, proof of purchase, or other documentation and generate a premium quote using a premium generator 124. If a digital image is received, the insurance engine 121 may use any known image processing software or other application(s) to obtain the data from the digital image. The data may be used in the generation of a premium quote.

The premium generator 124 may use any techniques(s) for generating a premium quote for insuring the digital asset 189. The premium generator 124 may use data retrieved from data source(s) 139 by the data source access engine 137. Additionally, the premium generator 124 may request and receive information pertaining to the digital asset 189 from the user 185 and/or the retailer 175. This information may be used in generation of the premium quote. After retrieving or otherwise receiving the data from the various sources, the premium generator 124 may use tools, applications, and aggregators, for example, to generate a premium quote for insurance of the digital asset 189. The premium quote may be provided to the user 185, who may accept the premium quote.

The institution system 105 may issue an insurance policy for the digital asset 189. A commercially available digital asset may be considered to be replaceable by purchase and may be insured for a particular value (e.g., replacement value) or for replacement (e.g., the institution may purchase or otherwise obtain a replacement copy of the digital asset for the user). A customized or personalized digital asset may be considered to be replaceable by backup. An insurance policy written for a customized or personalized digital asset may be for backing up the digital asset and for providing a backup copy of the digital asset to the user in the event of a loss.

If the user 185 incurs a loss of the digital asset 189, the institution system 105 may pay the user 185 the amount that the digital asset 189 was insured for. Alternatively, the institution system 105 may replace the digital asset 189, e.g., by contacting the retailer 175 and purchasing the digital asset 189 or providing a license key pertaining to the user's copy of the digital asset 189. A license key (also referred to as a product key) is a specific software-based key (generally comprising a series of numbers and/or letters) for a digital asset such as a particular software application or a computer game. It may be used to identify that the copy of the application/game is original. Activation is sometimes done offline by entering the key, or online activation may be used to prevent multiple people using the same key.

The institution system 105 may provide backup of the digital asset 189. A backup generator 126 may generate a copy of the digital asset 189 using known reproduction techniques and may store the copy in storage, such as the storage 108 or the data source(s) 139. If the user 185 incurs a loss of the digital asset 189, the institution system 105 may retrieve the backup copy and provide the backup copy to the user 185. In an implementation, if the user computing device on which the digital asset 189 was stored is also lost and insured, the institution may provide a replacement computing device to the user with the backup copy of the digital asset 189 stored thereon.

The insurance engine 121 may comprise a digital asset monitor 128 that may scan the user computing device 187 for digital assets stored thereon. The digital assets that the digital asset monitor 128 detects may be insured and/or backed up by the institution system 105 as described further herein.

The insurance engine 121 has access to data, files, and documents pertaining to the user 185 as well as any other data, files, and documents that are currently stored by the institution system 105 as well as external data, files, and documents and that may be useful in generating premium quotes for digital assets, writing insurance policies for digital assets, and backing up digital assets.

The institution system 105 has the ability to retrieve information from one or more data sources 139 via a data source access engine 137. Data pertaining to the user 185, the user's insurance policies, and/or the user account(s) may be retrieved from data source(s) 139 and/or external data sources. The retrieved data may be stored centrally, perhaps in storage 108. Other information may be provided to the institution system from the user 185 and/or the retailer 175.

Data source(s) 139 may contain data, metadata, email, files, and/or documents that the institution system 105 maintains pertaining to the user 185, such as personal data such as name, physical address, email address, etc., insurance policy data such as premiums and coverage amounts, as well as other account information. The institution system 105 may access this information when generating premium quotes or backing up digital assets, for example.

The retailer computing device 177 may provide access to a system maintained by the retailer 175, e.g., pertaining to digital assets which may have been obtained by the user 185 and which may be insured by the institution system 105. The institution may have the ability to interact with information that may be maintained and/or provided by the retailer 175.

A user access system may be communicatively coupled to the insurance engine 121 and may be configured to send machine-readable instructions to the insurance engine 121.

As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to digital asset insurance and backup data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein.

Examples of software modules 109 may include modules that may be used in conjunction with generating a premium quote for a digital asset 189 and sending the premium quote to the user 185, issuing an insurance policy for a digital asset 189, backing up a digital asset 189, and monitoring a user computing device 187 for digital assets, generating web page content for display, and receiving instructions from the user 185, for example. While specific functionality is described herein as occurring with respect to specific modules, the functionality may likewise be performed by more, fewer, or other modules. An example computing device and its components are described in more detail with respect to FIG. 6.

Figure 2:
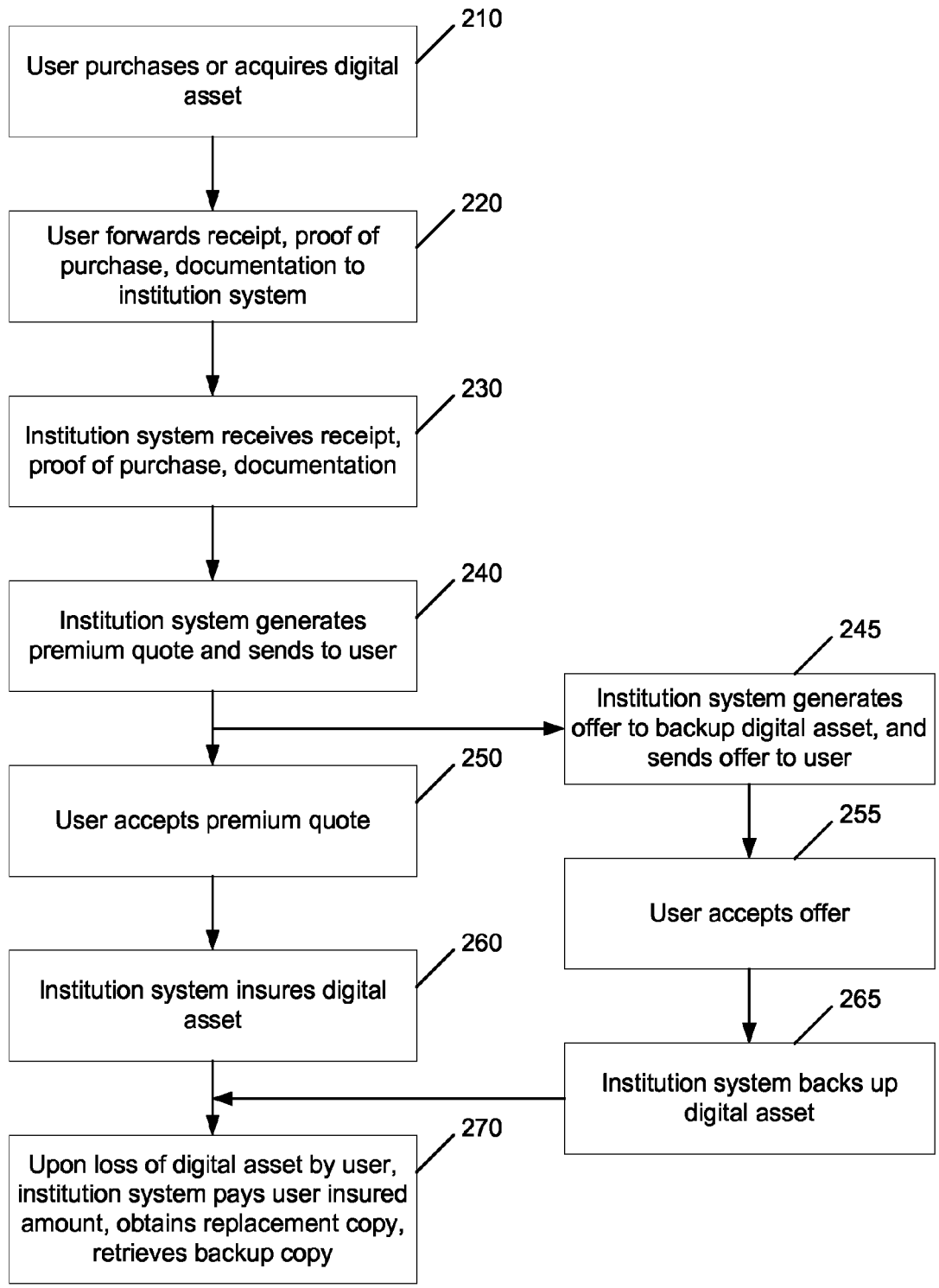
FIG. 2 is an operational flow of an implementation of a method that may be used to provide digital asset insurance.

FIG. 2 is an operational flow of an implementation of a method 200 that may be used to provide digital asset insurance. At 210, a user may purchase or otherwise acquire a digital asset, e.g. from a retailer. In an implementation, the user may download the digital asset from a retailer computing device. The digital asset may be sold by the retailer or available for free as freeware, for example. At 220, the user may forward a receipt, proof of purchase, and/or other documentation pertaining to the purchase and/or digital asset acquisition to the institution system, via email, a website, mail, facsimile, instant messaging, etc.

At 230, the institution system may receive the receipt, proof of purchase, and/or other documentation. Based on a variety of factors pertaining to the digital asset and/or the user, at 240, the institution system may generate a premium quote to insure the digital asset and send the premium quote to the user via any electronic or physical delivery technique(s). For generation of the premium quote, the institution system may request and receive additional information pertaining to the user and/or the digital asset from the user and/or the retailer. The premium quote may be for monetary reimbursement or replacement of the digital asset in the event of a loss. The user may accept the premium quote at 250, and the institution system may insure the digital asset at 260.

Alternatively or additionally, at 245 the institution may generate an offer to backup the digital asset and send the offer to the user, e.g., as a premium quote. The user may accept the offer to backup the digital asset at 255. At 265, the institution system may backup the digital asset. The institution system may store a backup copy of the digital asset, provided by the user, in storage internal and/or external to the institution system.

At some point, after a loss of the digital asset by the user, the institution system may pay the user the insured amount, may obtain a replacement copy of the digital asset, and/or may retrieve a backup copy of the digital asset at 270. In an implementation, the institution may act on behalf of the user to get a replacement copy of the digital asset from the retailer at 270 after the digital asset is lost. The institution system may store the product license key(s) of an insured digital asset such as a software application, and use the license key(s) to obtain a replacement copy of the software application e.g., from the retailer.

The user may have insurance for both their computing device and the digital assets stored thereon. If the user suffers a loss of the computing device and the digital assets stored thereon, the institution may provide the user with a new computing device with replacement digital assets stored thereon if available.

In an implementation, the user computing device may have an application resident thereon that monitors the user's digital asset purchases and/or acquisitions. When the application detects that a digital asset has been purchased or otherwise acquired, the application may advise the institution system. The application may recognize certain file types or data types as potentially insurable digital assets and may provide files or data of these types resident on the user computing device to the institution system for consideration as potentially insurable digital assets. The advisory may be received by the institution system at 230, and processing may continue at 240 and/or at 245. The application on the user computing device may be provided by the institution system, and may comprise a background plug-in to a web browser running on the user computing device, for example.

Figure 3:
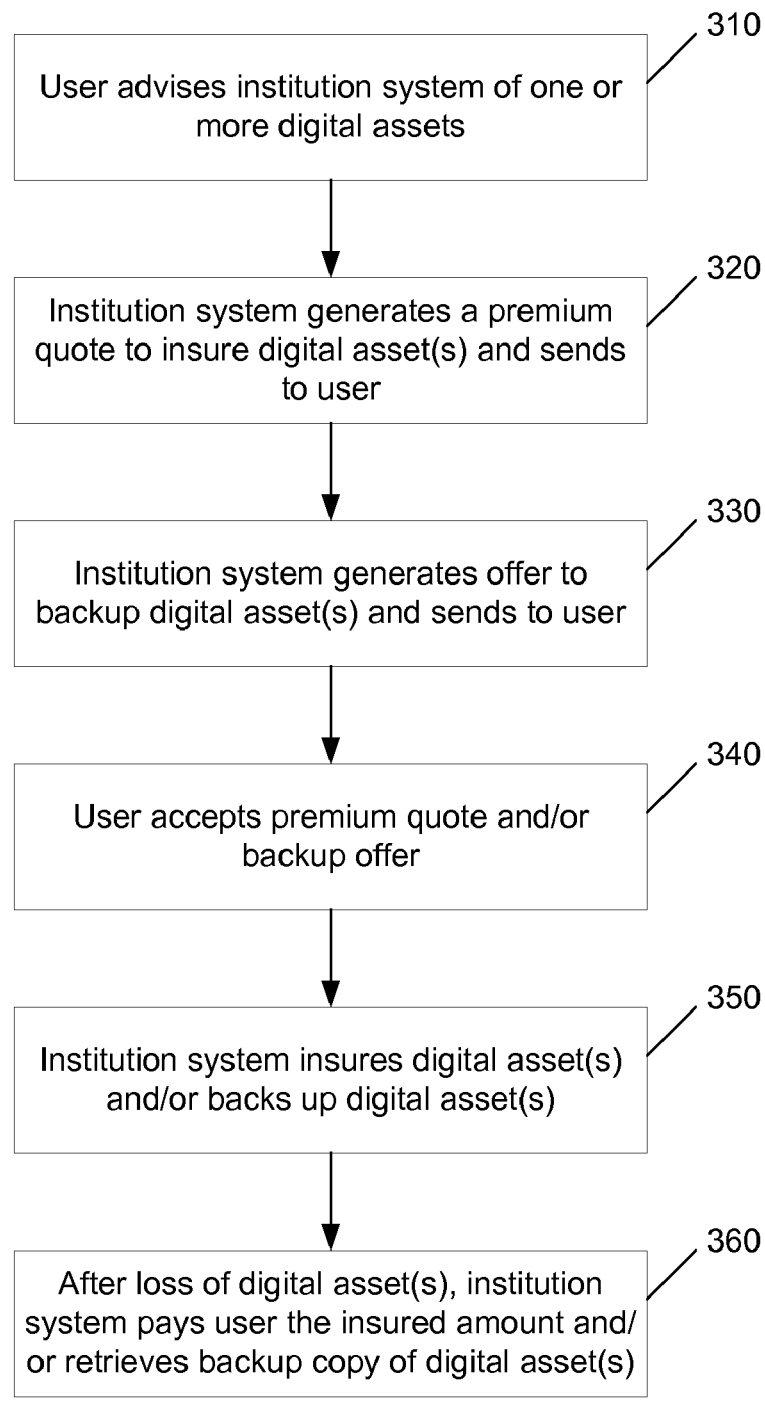
FIG. 3 is an operational flow of another implementation of a method that may be used to provide digital asset insurance.

The user may have digital assets that have been personalized by the user and/or are not commercially available, such as the user's personal data, documents, and files, digital photos, image, audio, video, and multimedia files, and the like. The institution system may insure these types of digital assets, paying the user an amount of money and/or providing a backup copy if the insured digital assets are lost. FIG. 3 is an operational flow of another implementation of a method 300 that may be used to provide digital asset insurance.

At 310, the user may advise the institution system of the one or more digital assets the user has. For example, the user may provide the institution system with a list of their data and/or files, a summary of their data and/or files, or the actual data and/or files. The user may provide the institution with this information using any transmission technique(s), such as via mail, email, facsimile, telephone, a website, etc. The user computing device may have an application stored thereon that generates the information and provides the information to the institution system. In an implementation, the institution system may request the information from the user and/or the user computing device and the user and/or the user computing device may provide the information in response. The institution system may request and/or receive the information one time or more frequently, such as continuously, from time to time, or periodically (e.g., daily, weekly, monthly, etc.).

At 320, the institution system may generate a premium quote to insure the digital asset(s) for monetary reimbursement and send the premium quote to the user. Additionally or alternatively, at 330, the institution may generate an offer to backup the digital asset(s) and may send the offer to the user as a premium quote. The user may accept the premium quote for monetary reimbursement and/or backup at 340, and the institution system may insure the digital asset(s) and/or backup the digital asset(s) at 350, e.g., by storing a backup copy of the digital asset(s) in storage internal and/or external to the institution system. The institution system may request that the user provide a copy of the digital asset(s) to the institution for analysis in the generation of a premium quote and/or backup storage.

At some point, after a loss of an insured digital asset by the user, the institution system may pay the user the insured amount and/or may retrieve a backup copy of the digital asset at 360.

Figure 4:
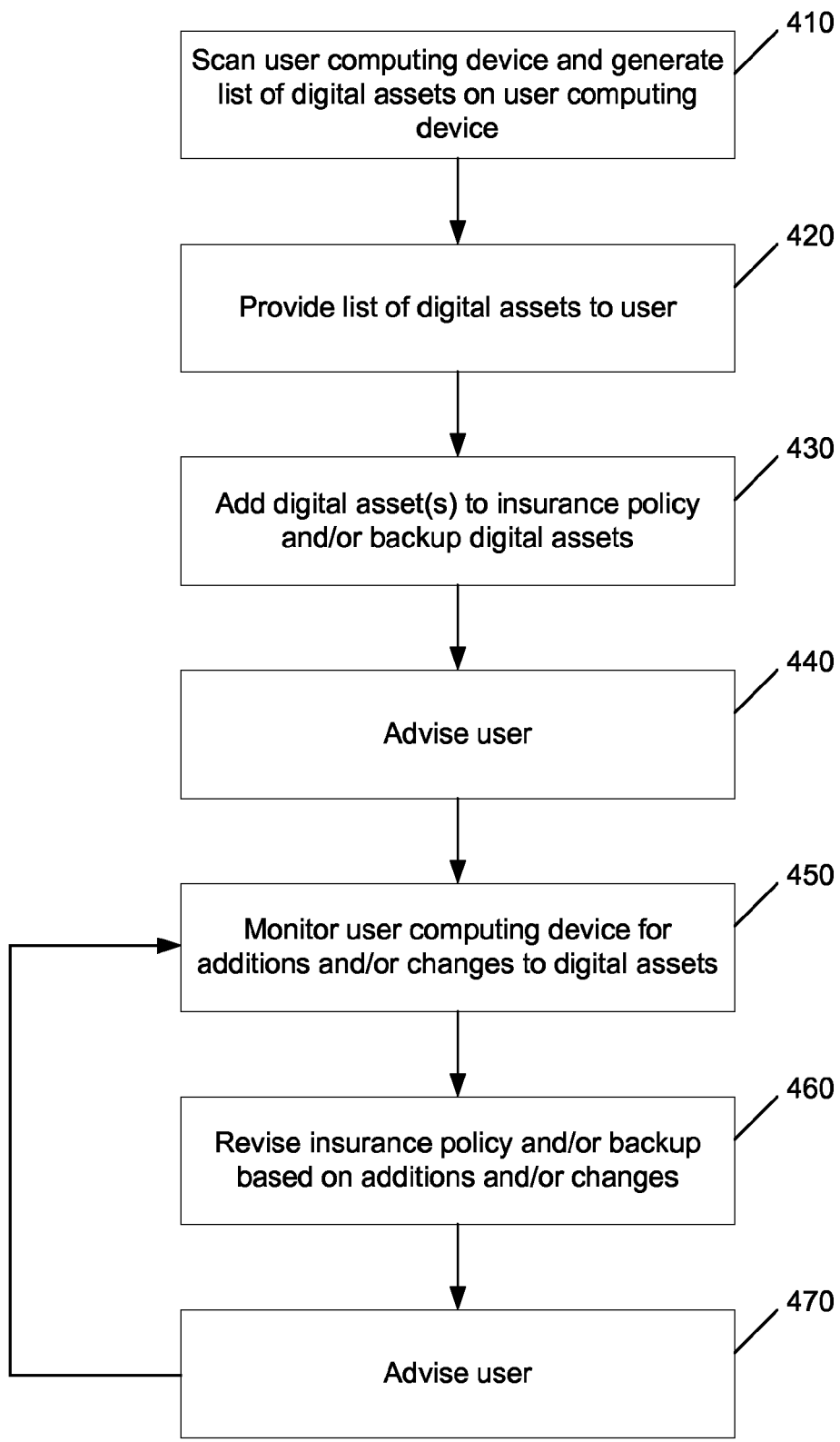
FIG. 4 is an operational flow of another implementation of a method that may be used to provide digital asset insurance.

FIG. 4 is an operational flow of another implementation of a method 400 that may be used to provide digital asset insurance. At 410, the institution system may scan the user computing device to detect digital assets resident thereon, and may generate a list of the digital assets that may be insurable (e.g., media (music, videos, movies), personal files, software license keys, software applications (commercial, freeware), etc.).

At 420, the institution system may provide the list of digital assets to the user. For each digital asset on the list, at 430, the institution system may add the digital assets to an insurance policy that provides insurance for monetary reimbursement, replacement and/or backup of the digital asset, as appropriate for the particular digital asset as determined by the institution system and/or previously designated by the user. The digital assets designated for backup may be backed up by the institution system. The user may be advised at 440, and may also be provided with a premium quote for the insurance that is being provided.

At 450, the institution system may monitor the user computing device for additions and/or changes to the digital assets resident thereon. In an implementation, at some point, for example at a particular time in the future, continuously, from time to time, or periodically (e.g., once per week, once per month, etc.), the institution system may scan the user computing device for additions and/or changes to the digital assets. In an implementation, the user may request or otherwise initiate a scan of the user computing device for additions and/or changes to the digital assets.

At 460, the institution system may revise the insurance policy and backed up digital assets based on the current digital assets stored on the user computing device. The user may be advised at 470 of the additions and/or changes since the previous scan. Processing may continue at 450.

Figure 5:
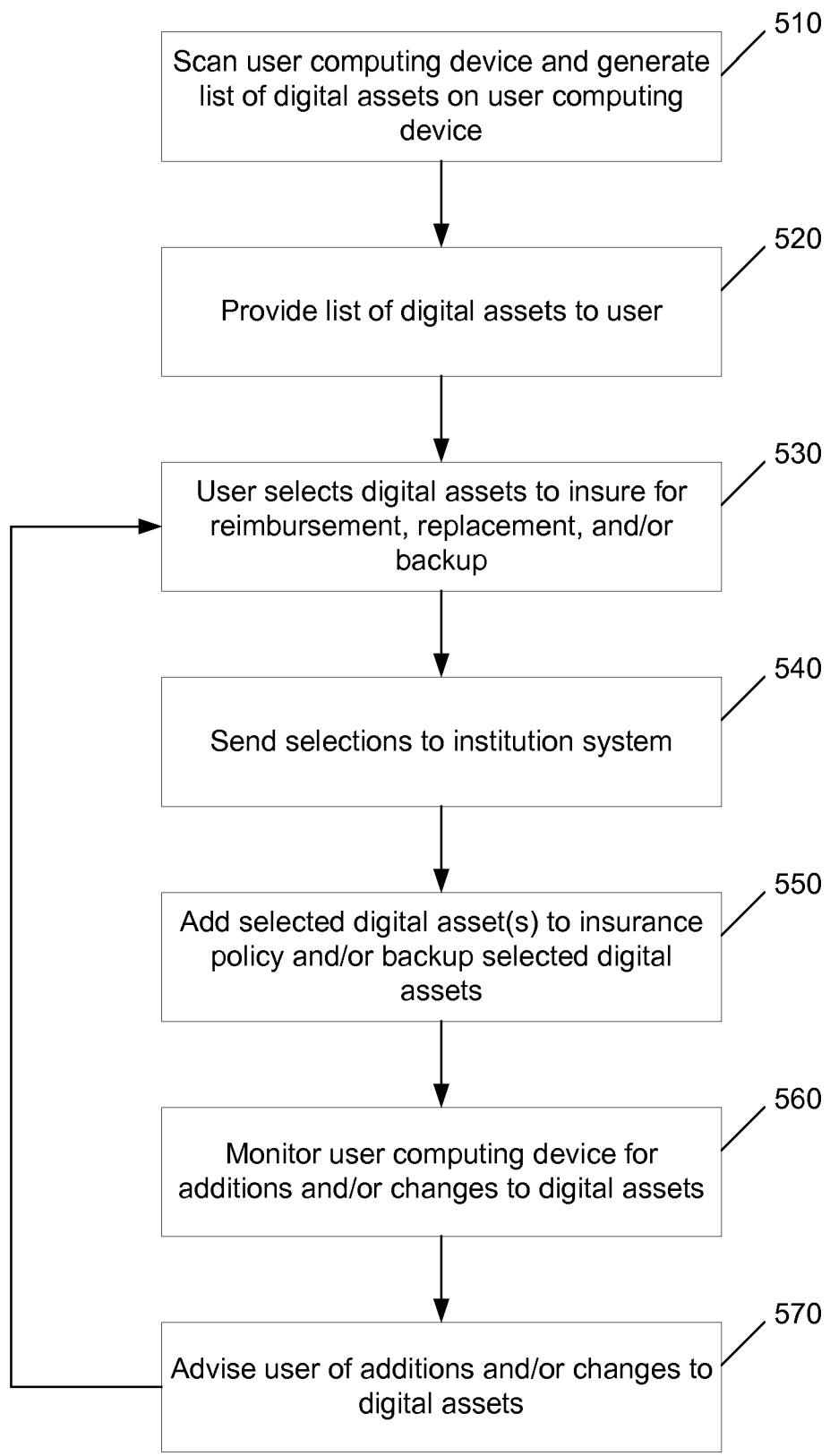
FIG. 5 is an operational flow of another implementation of a method that may be used to provide digital asset insurance.

FIG. 5 is an operational flow of another implementation of a method 500 that may be used to provide digital asset insurance. At 510, the institution system may scan the user computing device and generate a list of the digital assets resident on the user computing device. At 520, the institution system may provide the list of digital assets to the user.

For each digital asset on the list, at 530, the user may select to insure for monetary reimbursement, replacement, and/or backup the digital asset or do neither. The selections may be sent to the institution system at 540. Accordingly, at 550, the institution system may insure the digital assets selected and may backup the digital assets selected for backup (e.g., pursuant to providing a premium quote and receiving acceptance and/or payment from the user). Documentation and/or data pertaining to the digital assets selected for insurance may be provided to the institution system by the user and/or by the retailer.

At 560, the institution system may monitor the user computing device for additions and/or changes to the digital assets resident thereon. In an implementation, at some point, for example at a particular time in the future, continuously, from time to time, or periodically (e.g., once per week, once per month, etc.), the institution system may scan the user computing device for additions and/or changes to the digital assets. In an implementation, the user may initiate the institution system scanning the user computing device for additions and/or changes to the digital assets. The institution system may generate a revised list of digital assets based on the monitoring.

At 570, the institution system may advise the user of the additions and/or changes since the previous scan (e.g., by providing the revised list to the user) and ask the user if they would like to add reimbursement or replacement insurance and/or backup to the additions and/or changes to the digital assets. The user may be prompted to select reimbursement and/or replacement insurance and/or backup or ignore each addition and/or change to the digital assets on the user computing device. Processing may continue at 530.

It is contemplated that a user may have multiple computing devices on which digital assets may be stored. In an implementation, the institution system may insure for reimbursement, replacement and/or backup the digital assets on each computing device associated with the user (e.g., multiple computing devices in the user's household, multiple computing devices maintained by the user in various locations, etc.).

The institution system may monitor the multiple computing devices for additions and/or changes to the digital assets and may advise the user accordingly, e.g., with a request to the user if they would like to add reimbursement and/or replacement insurance and/or backup to the additions and/or changes to the digital assets on the multiple computing devices. In an implementation, a software agent may be provided on each computing device having digital assets that are covered by the digital asset insurance. It is noted that each of the multiple computing devices may store different digital assets; that is, a single copy of a digital asset may reside on one of the user computing devices and not on other user computing devices.

Exemplary Computing Arrangement

Figure 6:
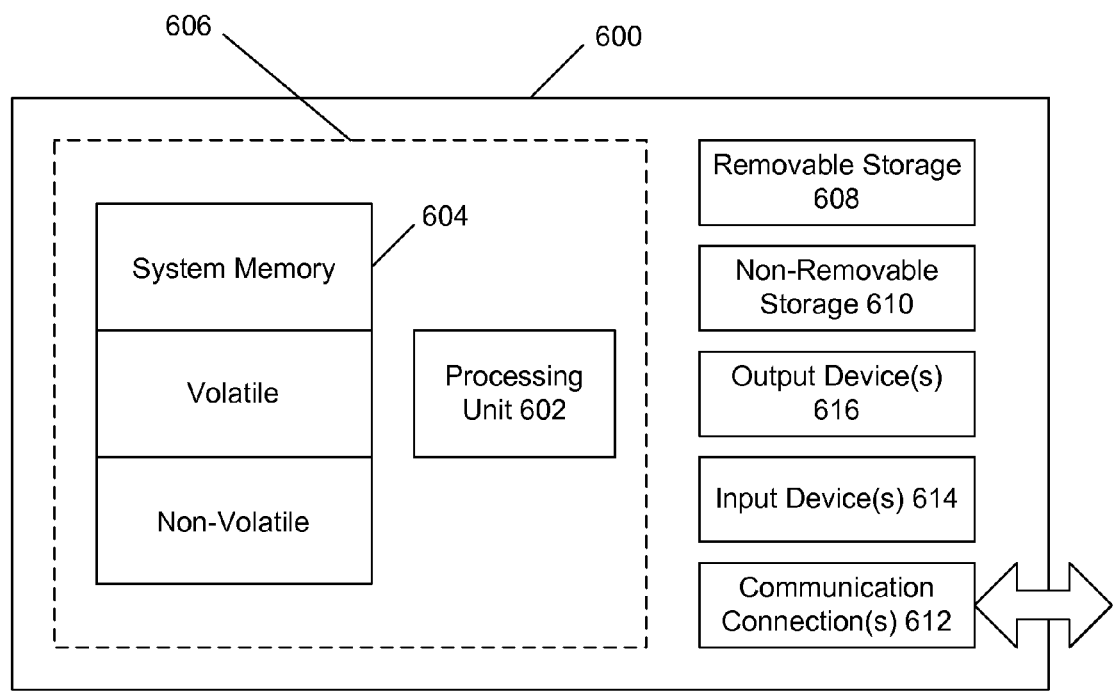
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A digital file insurance method, comprising:
   using a non-transitory computer-readable medium having computer-readable instructions stored thereon for execution by a number of processors in a number of computing devices for:
   generating a list of a plurality of digital files stored on a user computing device of a user;
   providing the list of the digital files to the user;
   receiving instructions from the user regarding digital file insurance for the digital files;

receiving information by an insuring institution from a user of a digital file, a retailer of the digital file, or a user computing device used to store the digital file;

providing an insurance policy to the user comprising insurance for the selection of the at least one of the digital files, wherein the insurance of the at least one of digital files comprises a selection by the insuring institution or the user between a monetary reimbursement of the digital file, a replacement of the digital file by a retailer, and a backup of the digital file without a monetary reimbursement or replacement by the retailer of the user computing device used to store the digital data;

monitoring the user computing device for additions or changes to the digital files;

revising the list of digital files;

providing a revised list of digital files to the user;

receiving instructions from the user regarding digital file insurance for at least one of the digital files on the revised list; and providing insurance for the at least one of the digital files on the revised list in accordance with the instructions from the user.

2. The method of claim 1, wherein the instructions from the user comprise a selection of at least one of the digital files for digital file insurance.

3. The method of claim 2, further comprising generating a premium quote to insure the selection of the at least one of the digital files and providing the premium quote to the user.

4. The method of claim 1, wherein monitoring the user computing device is performed continuously, periodically, or upon initiation by the user.

5. A non-transitory computer-readable medium comprising computer-readable instructions for digital file insurance, said computer-readable instructions comprising instructions that are executed by a number of processors to:

generate a list of a plurality of digital files stored on a user computing device of a user;

provide the list of the digital files to the user;

receive instructions from the user regarding digital file insurance for the digital files;

receive information by an insuring institution from a user of a digital file, a retailer of the digital file, or a user computing device used to store the digital file;

provide an insurance policy to the user comprising insurance for the selection of the at least one of the digital files, wherein the insurance of the at least one of digital files comprises a selection by the insuring institution or the user between a monetary reimbursement of the digital file, a replacement of the digital file by a retailer, and a backup of the digital file without a monetary reimbursement or replacement by the retailer of the user computing device used to store the digital data;

monitor the user computing device for additions or changes to the digital files;

revise the list of digital files;

provide a revised list of digital files to the user;

receive instructions from the user regarding digital file insurance for at least one of the digital files on the revised list; and provide insurance for the at least one of the digital files on the revised list in accordance with the instructions from the user.

6. The computer-readable medium of claim 5, wherein the instructions from the user comprise a selection of at least one of the digital files for digital file insurance.

7. The computer-readable medium of claim 6, further comprising instructions that generate a premium quote to insure the selection of the at least one of the digital files and provide the premium quote to the user.

8. The computer-readable medium of claim 5, wherein monitoring the user computing device is performed continuously, periodically, or upon initiation by the user.

9. A digital file insurance system, comprising:

a number of processors in a number of computing devices that execute non-transitory computer-readable instructions;

at least one subsystem that generates a list of a plurality of digital files stored on a user computing device of a user;

at least one subsystem that provides the list of the digital files to the user;

at least one subsystem that receives instructions from the user regarding digital file insurance for the digital files;

at least one subsystem that receives information by an insuring institution from a user of a digital file, a retailer of the digital file, or a user computing device used to store the digital file; and at least one subsystem that provides an insurance policy to the user comprising insurance for the selection of the at least one of the digital files, wherein the insurance of the at least one of digital files comprises a selection by the insuring institution or the user between a monetary reimbursement of the digital file, a replacement of the digital file by a retailer, and a backup of the digital file without a monetary reimbursement or replacement by the retailer of the user computing device used to store the digital data;

at least one subsystem that monitors the user computing device for additions or changes to the digital files;

at least one subsystem that revises the list of digital files;

at least one subsystem that provides a revised list of digital files to the user;

at least one subsystem that receives instructions from the user regarding digital file insurance for at least one of the digital files on the revised list; and at least one subsystem that provides insurance for the at least one of the digital files on the revised list in accordance with the instructions from the user.

10. The system of claim 9, wherein the instructions from the user comprise a selection of at least one of the digital files for digital file insurance.

11. The system of claim 10, further comprising at least one subsystem that generates a premium quote to insure the selection of the at least one of the digital files and provides the premium quote to the user.

12. The system of claim 9, wherein monitoring the user computing device is performed continuously, periodically, or upon initiation by the user.

* * * * *